United States Patent [19]

Hartman

[11] 4,432,742
[45] Feb. 21, 1984

[54] PTO MASTER SHIELD

[75] Inventor: Wayne E. Hartman, Racine, Wis.

[73] Assignee: J. I. Case Company, Racine, Wis.

[21] Appl. No.: 328,128

[22] Filed: Dec. 7, 1981

[51] Int. Cl.³ .............................................. F16D 3/84
[52] U.S. Cl. ..................................... 464/176; 74/609
[58] Field of Search .............. 464/176, 170; 74/609, 74/608, 15.6; 180/53 R, 53 A, 53 B, 53 D

[56] References Cited

U.S. PATENT DOCUMENTS

| | | | |
|---|---|---|---|
| 2,410,503 | 11/1946 | Johnson | 464/176 X |
| 2,443,035 | 6/1948 | Hardy | 464/176 X |
| 2,858,680 | 11/1958 | Harrington | 464/176 X |
| 2,967,432 | 1/1961 | Shane et al. | 74/15.6 |
| 3,389,763 | 6/1968 | Meinert | 74/608 X |
| 4,008,383 | 11/1979 | Davis | 464/176 X |

FOREIGN PATENT DOCUMENTS 459065  4/1928  Fed. Rep. of Germany ........ 74/609

Primary Examiner—John M. Jillions
Assistant Examiner—Daniel P. Stodola
Attorney, Agent, or Firm—Dressler, Goldsmith, Shore, Sutker & Milnamow, Ltd.

[57] ABSTRACT

The present invention contemplates a shield arrangement for the power take-off shaft of a tractor or like piece of equipment. The arrangement includes an inverted, U-shaped shield member which is pivotally mounted to the tractor for movement between raised and lowered positions, wherein in the lowered position the power take-off shaft is shielded. The arrangement further includes a spring-loaded, strut-like link pivotally mounted within the shield member. The link member is adapted to contact the power take-off shaft for supporting the shield member in its raised position, with the link member configured to disengage the take-off shaft upon initiation of the shaft's rotation for automatically lowering the shield member.

4 Claims, 7 Drawing Figures

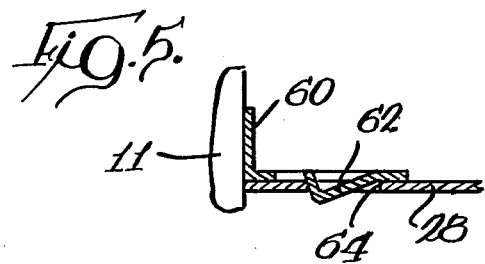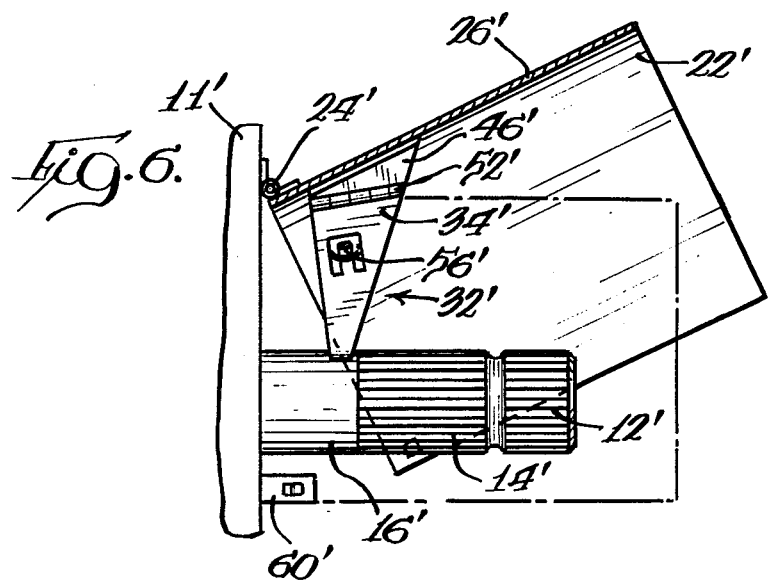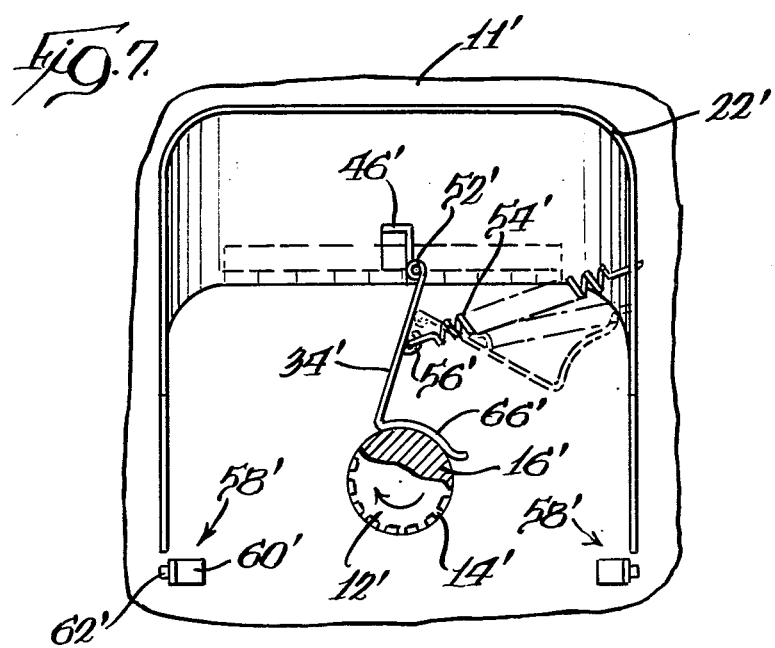

PTO MASTER SHIELD

BACKGROUND OF THE INVENTION

This invention relates to a power take-off shaft and master shield arrangement of the type finding special utility in the agricultural tractor field, wherein the power take-off shaft is used for driving associated implements. It is common to refer to such a power take-off shaft as a PTO shaft, and such designation shall be used throughout the specification and claims.

In agricultural and general purpose tractors a PTO shaft extends rearwardly of the tractor to receive a drive shaft associated with a trailing implement. Safety shields are provided as regular equipment with the sale of tractors and implements to protect the operator from the exposed portion of the tractor PTO shaft and the front universal joint of the implement drive shaft. It has been found, however, that the operator is frequently not concerned with his own safety but rather is concerned with the speed of assembling and disassembling the tractor trailing implements from the tractor. As a result, the safety shields are frequently removed and not replaced. It has heretofore been recognized that it is desirable to provide a safety shield that will not necessitate its entire removal during assembly and disassembly operations and which will automatically resume its safety covering position even though the operator negligently leaves it in a raised position.

The foregoing general results have heretofore been obtained in such patented structures as those disclosed in U.S. Pat. No. 2,443,035 to Hardy, U.S. Pat. No. 2,858,680 to Harrington, U.S. Pat. No. 2,967,432 to Shane et al., U.S. Pat. No. 3,389,763 to Meinert, and U.S. Pat. No. Re 30,152 to Davis. However, these constructions leave much to be desired in the way of accommodating the positioning of the shield and in simplicity of construction and operation.

SUMMARY OF THE INVENTION

In accordance with the present invention, a master shield is pivotally supported, or supported by other means, to the vehicle so that it can be moved between a lowered or operative position and a raised or inoperative position. A spring-loaded latching arrangement is provided to support the master shield in its raised position. The latching arrangement includes a pivotal link member which rests on the PTO shaft, to support the master shield in its raised position, in a manner which does not interfere with assembly or removal of the universal joint of the implement drive line. The link member has a second position wherein the shield is permitted to move to its lowered position. The link member is biased towards its second position in a manner which automatically moves the master shield to its lowered position upon rotation of the PTO shaft. The PTO shield arrangement in accordance with the present invention is simple to operate and therefore the operator of the vehicle will no longer have the incentive to circumvent the safety aspects afforded by use of such a shield.

The above and additional advantages of the present invention will become apparent to those skilled in the art from a consideration of the following detailed description of the preferred embodiments when taken in conjunction with the accompanying drawings.

BRIEF DESCRIPTION OF THE DRAWINGS

FIG. 5 is a cross-sectional view taken along line 5—5 in FIG. 4;

FIG. 6 is a side elevational view, partially in section, showing an alternate embodiment of the PTO shield assembly with the shield member shown in solid lines in its raised position and in phantom lines in its lowered position; and FIG. 7 is an end elevational view, partially broken away, of the shield assembly as shown in FIG. 6 showing the locking arrangement in its first position in solid lines and in its second position in phantom lines.

DESCRIPTION OF PREFERRED EMBODIMENTS

Figure 1:
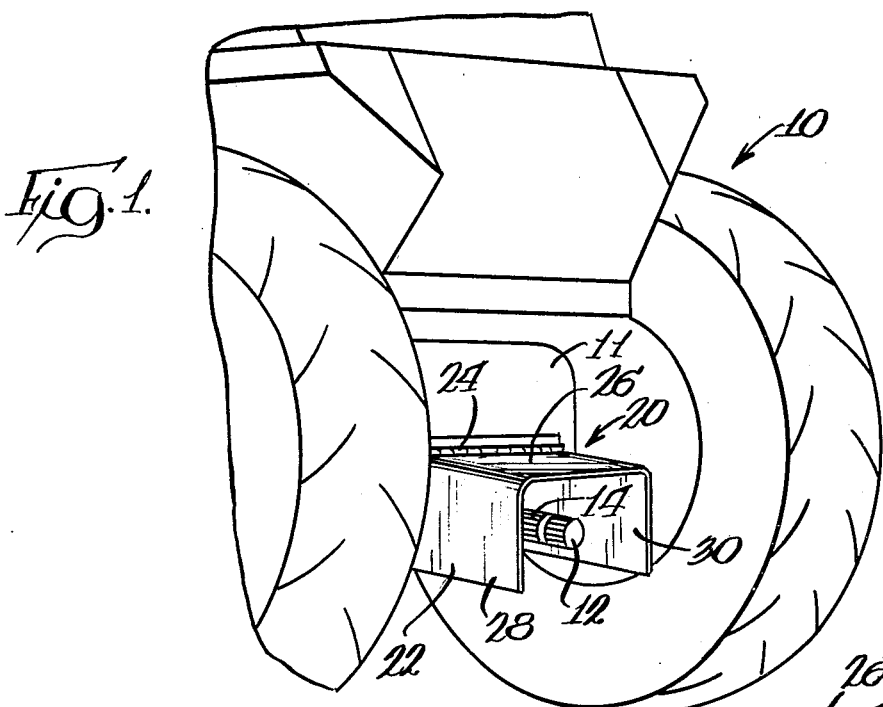
FIG. 1 is a perspective view of one end of a tractor showing the PTO shield assembly of the present invention in its lowered position.

Referring to FIG. 1, therein is shown the rear end of a tractor generally designated by the numeral 10. Protruding from a rear wall 11 of the tractor 10 is a PTO shaft 12. The exposed end of the PTO shaft 12 is generally provided with spines 14 at its rear end and a smooth surface indicated at 16 at its forward end. PTO shaft 12 is designed for receiving the yoke of a universal joint (not shown) in a manner well known in the art.

Figure 2:
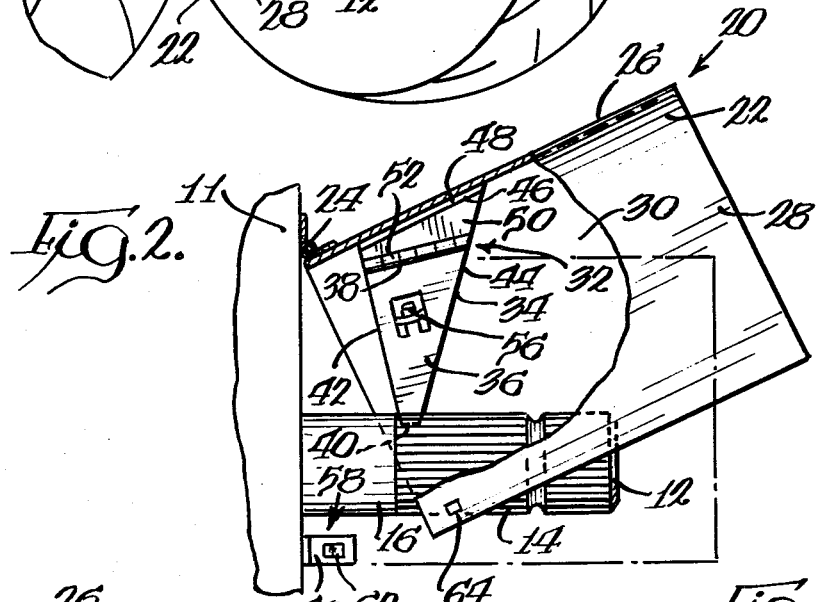
FIG. 2 is a side elevational view, partially broken away, showing a first embodiment of the PTO shield assembly with the shield member shown in solid lines in its raised position and in phantom lines in its lowered position.

Referring to FIGS. 1 and 2, a master shield assembly, indicated generally at 20, is pivotally mounted to rear wall 11. Shield assembly 20 includes a shield member 22, of generally inverted U-shape configuration, which is pivotably mounted to rear wall 11 about a substantially horizontal axis perpendicular to PTO shaft 12 by a suitable hinge member 24. Shield member 22 has a top portion 26 and side portions 28 and 30. Shield member 22 has a lowered or operative position, as seen in FIG. 1, wherein the forward edges of top portion 26 and side portions 28 and 30 are in contact with rear wall 11. When in this position the side portions 28 and 30 surround the exposed portion of the PTO shaft 12 and protect the operator from potential hazards associated with a rotating PTO shaft. Shield member 22 has a raised or inoperative position, as seen in FIG. 2, wherein the shield member 22 is pivoted upwardly about hinge member 24 in a manner wherein the forward edges of side portions 28 and 30 are spaced from rear wall 11 and the rear end of PTO shaft 12 is exposed to facilitate the assembly and removal of an implement drive line therefrom.

Figure 3:
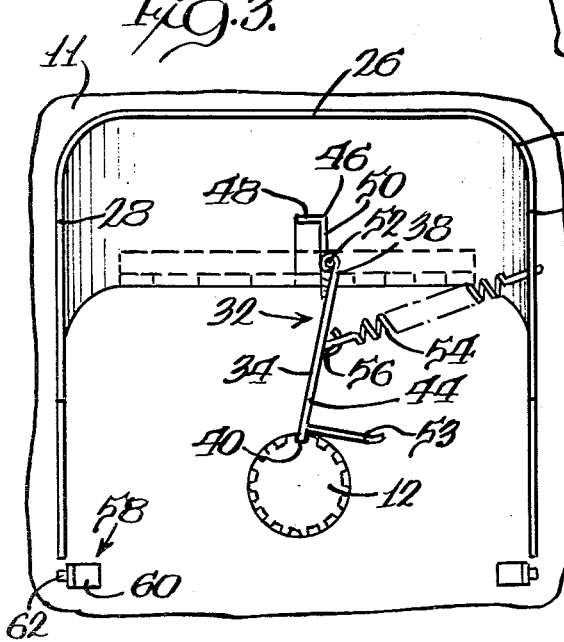
FIG. 3 is an end elevational view of the shield assembly as shown in FIG. 2.
Figure 4:
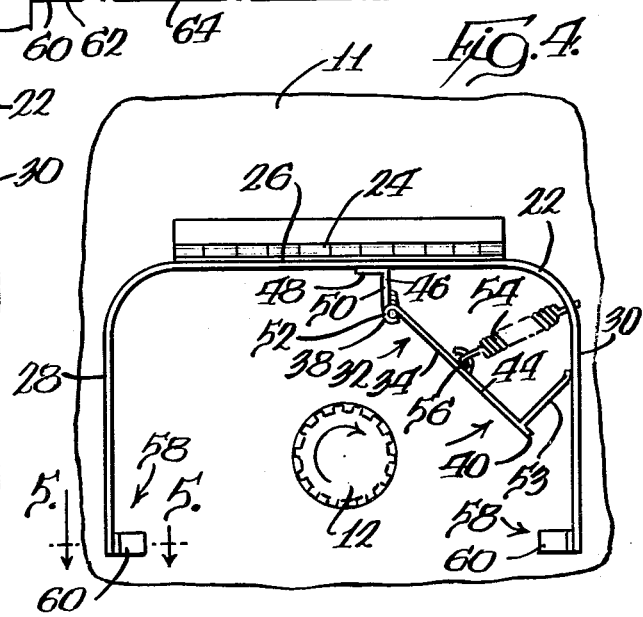
FIG. 4 is an end elevational view of the shield assembly as shown in FIG. 3 with the shield member in its lowered position.

In accordance with the present invention, a latching arrangement indicated generally at 32 is provided to selectively support shield member 22 in its raised position. Referring to FIGS. 2, 3 and 4, latching arrangement 32 includes a link member 34 which is pivotally mounted to the inner surface of top portion 26 of shield member 22. Link member 34 is preferably formed from a plate member 36 having an upper edge 38, a lower edge 40 and a pair of side edges 42 and 44. Upper edge 38 of plate 36 is pivotally mounted to an angle bracket member 46 which in turn is secured to the inner surface of top portion 26. Angle bracket member 46 has a leg portion 48 which is secured to top portion 26 in a suitable manner such as welding or the like, and a leg portion 50 which is pivotally secured to the upper edge 38 of plate 36 through a hinge 52. Link member 34 preferably includes a leg member 53 which extends outwardly therefrom, perpendicular to member 34 a short distance above lower edge 40.

Link member 34 pivots about hinge 52 between a first position wherein lower edge 40 is received between a pair of adjacent spines 14 of PTO shaft 12 and the shield member 22 is supported in its raised position, as seen in FIGS. 2 and 3, and a second position wherein the link member is spaced from the PTO shaft 12 and the shield member 22 is in its lowered position, as seen in FIG. 4. It is preferable that lower edge 40 be parallel to the axis of PTO shaft 12 when link member 34 is in its first position and the upper edge 38 is inclined so as to prevent interference between the link member 34 and the wall 11 when the shield member 22 is in its lowered position. The above recited relationships are attained in accordance with the invention, by the fact that side edge 44 is longer than side edge 42 and upper edge 38 extends downwardly and rearwardly when shield member 22 is in its lowered position. As best seen in FIG. 3, an imaginary longitudinal plane which passes through hinge 52 is spaced from the center axis of PTO shaft 12 in the direction of movement of link member 34 as it moves between its first and second positions. Accordingly, when link member 34 is in its first position, it is slanted downwardly towards the center axis of the PTO shaft 12.

A spring member 54 is provided to bias link member 34 towards its second position out of engagement with PTO shaft 12. Spring member 54 is retained at one end to hook arrangement 56, secured to an intermediate point on link member 34, and at its other end through an opening in an upper portion of side portion 30.

In order to maintain shield member 22 in its lowered or operative position, a locking arrangement 58 is preferably provided to lock the forward portions of the lower ends of side portions 28 and 30 to wall 11. Locking arrangement 58 includes a pair of latch members 60 having outwardly extending, flexible, stamping portions 62 which are positioned to be received in openings 64 formed in side portions 28 and 30 when shield member 22 is moved into its lowered position.

The discussion of the operation of master shield assembly 20, which hereinbelow follows, further discloses various structural relationships which are pertinent to the present invention.

At the start of operation the shield member 22 is in its lowered or operative position as shown in FIGS. 1 and 4. When in this position, the shield member 22 surrounds PTO shaft 12 in a manner which protects the operator from the obvious dangers associated with contact with a rotating shaft. The link member 34 is in its second position, spaced from PTO shaft 12, such that leg portion 53 is in contact with side portion 30. The shield member 22 is secured in this position by locking arrangement 58 such that portions 62 extend through corresponding openings 64.

At such time as it is necessary to either assemble or remove the yoke of a universal joint from the PTO shaft 12, the shield member 22 is pivoted to its raised or inoperative position, as seen in FIGS. 2 and 3. To so position shield member 22, the rear end thereof is lifted so as to pivot it about hinge member 24 with sufficient force to disengage portions 62 from openings 64. Shield member 22 is supported in its raised position by pivoting link member 34 about hinge member 52 against the bias of spring member 54. Link member 34 is positioned such that lower edge 40 is received between a pair of adjacent spines 14 which are substantially in a common plane with an imaginary vertical plane which cuts PTO shaft 12 in half. As seen in FIG. 3, the link member 34 when in this position is in what might be called an overcentered position and is retained in place against the bias of spring member 54 by the spines 14. With master shield assembly 20 so positioned, the shield member 22 does not interfere with assembly or removal of the universal joint of an implement drive line.

Upon completion of the assembly or removal of the universal joint, the shield member 22 is lifted slightly so as to disengage the link member 34 from the spines 14, which causes the spring member 54 to automatically return link member 34 to its second position. The shield member 22 is then released and returned to its operative position with sufficient closing force to return portions 62 back into locking engagement through openings 64. Should the operator forget to so manually lower the shield member 22, upon clockwise rotation of the PTO shaft 12, the link member 34 is forced upward by the spines 14 and disengages therefrom so as to automatically return same to its second position and allow shield member 22 to drop to its lowered position. This self-closing action prevents the implement from being operated with the shield member 22 in its raised position. In order to assure this self-closing action it is necessary to prevent link member 34 from becoming positioned on the side of PTO shaft 12 opposite of the spring member 54. As best seen in FIG. 3, leg portion 53 is preferably so positioned to contact the spines 14 and thereby prevent link member 34 from becoming so positioned, even if the PTO shaft is rotated in a counterclockwise direction.

Referring to FIGS. 6 and 7 an alternate embodiment of the latching arrangement is indicated at 32'. Latching arrangement 32' is similar in construction and operation to latching arrangement 32 except that latching arrangement 32' is designed to contact the smooth surface 16 of PTO shaft 12. The elements of latching arrangement 32' which correspond with identical elements of latching arrangement 32 are identified by the same reference numeral followed by a prime sign. Latching arrangement 32' is of identical construction to latching arrangement 32 except that it is secured to a more forward section of top portion 26 and the lower end of link member 34' is formed to be received around a portion of smooth surface 16 of the PTO shaft 12. Accordingly, reference is made to the disclosure of latching arrangement 32 for disclosure of the elements common to latching arrangement 32' and only a disclosure of such different elements hereinbelow follows.

As best seen in FIG. 7, the lower end of link member 34' is provided with a curved or convex portion 66' which extends outwardly therefrom in the direction of the spring member 54'. Convex portion 66' preferably has the same radius of curvature as that of the smooth surface 16', such that when link member 34' is in its first position convex portion 66' is received around a minor segment of surface 16'. When in such a position link member 34' is effective to support shield member 22' in its raised or inoperative position. The operation of shield arrangement 22' is otherwise identical to the operation of shield arrangement 22 as hereinabove discussed in detail. It should be noted that when link member 34' is in its first position there is sufficient friction between convex portion 66' and surface 16' such that when PTO shaft 12' is rotated in a clockwise direction the shield member 22' is sufficiently lifted to cause the link member 34' to automatically move to its second position due to the action of spring member 54'.

It will therefore be apparent that the PTO shaft and shield arrangements disclosed herein have taken into consideration the several factors concerned with proper design of the structure from the standpoints of safety, economy of design and ease in use and maintenance. Features other than those enumerated, as well as modifications in the preferred embodiments illustrated, may be achieved without departure from the spirit and scope of the invention.

What is claimed is:

1. A PTO shield assembly for a tractor having a PTO shaft protruding a short distance from a wall of the tractor, said shield assembly comprising: an inverted, U-shaped shield member extending above and to the side of the PTO shaft and secured to said wall of the tractor for pivotation about a substantially horizontal axis perpendicular to the axis of the PTO shaft, said shield member having a lowered position and a raised position; and a link member pivotally secured to a top portion of said shield member and extending downwardly therefrom for selective support of said shield member in its raised position, said link member having a first position wherein said shield member is supported in its raised position and a second position wherein said shield member is in its lowered position, said link member when in said first position being in contact with said PTO shaft and when in said second position being spaced from said PTO shaft, biasing means for normally biasing said link member into its second position, said biasing means extends between said link member and said shield member, and means for automatically moving said shield member from its raised position to its lowered position upon rotation of said PTO shaft.

2. The PTO assembly as defined in claim 1 wherein said biasing means is a spring member extending between said link member and said shield member.

3. A PTO shield assembly for a tractor havng a PTO shaft protruding a short distance from a wall of the tractor, said shield assembly comprising: an inverted, U-shaped shield member extending above and to the side of the PTO shaft and secured to said wall of the tractor for pivotation about a substantially horizontal axis perpendicular to the axis of the PTO shaft, said shield member having a lowered position and a raised position; and a link member pivotally secured to a top portion of said shield member and extending downwardly therefrom for selective support of said shield member in its raised position, said link member having a first position wherein said shield member is supported in its raised position and a second position wherein said shield member is in its lowered position, said link member having a curved portion associated therewith for receipt about a smooth surface formed on said PTO shaft when said link member is in its first position and when in said second position is spaced from said PTO shaft, and means for automatically moving said shield member from its raised position to its lowered position upon rotation of said PTO shaft.

4. The PTO shield assembly as defined in claim 3 wherein biasing means extends between said link member and said shield member so as to bias said link member towards its second position.

* * * * *